(12) United States Patent
Veerabhadraiah et al.

(10) Patent No.: US 12,001,468 B1
(45) Date of Patent: Jun. 4, 2024

(54) KEY-VALUE INFORMATION EXTRACTION FROM UNSTRUCTURED DATA

(71) Applicant: Freshworks Inc., San Mateo, CA (US)

(72) Inventors: Rudresh Veerabhadraiah, Bengaluru (IN); Sachin Adlakha, Santa Clara, CA (US); Charan Kumar, Bengaluru (IN)

(73) Assignee: Freshworks Inc., San Mateo, CA (US)

( * ) Notice: Subject to any disclaimer, the term of this patent is extended or adjusted under 35 U.S.C. 154(b) by 0 days.

(21) Appl. No.: 18/191,641

(22) Filed: Mar. 28, 2023

(51) Int. Cl.
  *G06F 16/35* (2019.01)
  *G06F 16/335* (2019.01)

(52) U.S. Cl.
  CPC ............ *G06F 16/35* (2019.01); *G06F 16/335* (2019.01)

(58) Field of Classification Search
  CPC ................................ G06F 16/35; G06F 16/335
  See application file for complete search history.

(56) References Cited

U.S. PATENT DOCUMENTS

| | | | |
|---|---|---|---|
| 10,860,396 B1 * | 12/2020 | Bonnell | G06F 16/3347 |
| 2021/0157809 A1 * | 5/2021 | Mor | G06F 16/27 |
| 2022/0222208 A1 * | 7/2022 | Sawyer | G06F 16/156 |

OTHER PUBLICATIONS

Chen, et al., "Identifying Linked Incidents in Large-Scale Online Service Systems", ESEC/FSE 20, Nov. 8-13, 2020, Virtual Event, USA.

* cited by examiner

*Primary Examiner* — Kannan Shanmugasundaram
(74) *Attorney, Agent, or Firm* — LeonardPatel PC; Sheetal S. Patel; Michael A. Leonard, II

(57) ABSTRACT

Extracting key-value attributes from unstructured data includes a parser receiving a first incident comprising key-value attributes and a second incident comprising key-value attributes, and parsing the first incident for the key-value attributes and the second incident for key-value attributes. A machine learning (ML) model perform a pairwise comparison of one or more common key-value attributes associated with the first incident and the second incident. A cosine similarity module computes a cosine similarity between the one or more common key-value attributes to generate a score for each of the one or more common key-value attributes associated with the first incident and the second incident, and generates a final score between the first incident and the second incident by averaging all cosine similarity scores computed for each of the one or more common key-value attributes.

20 Claims, 3 Drawing Sheets

KEY-VALUE INFORMATION EXTRACTION FROM UNSTRUCTURED DATA

FIELD

The present invention relates to data extraction, and more particularly, to an algorithm configured to extract key-value data from an incident.

BACKGROUND

An information technology operations management (ITOM) incident refers to an unforeseen event or issue that has the potential to affect the normal performance and functionality of an IT system, service, or application. These incidents can arise from multiple sources, such as hardware or software malfunctions, network glitches, security breaches, or human errors. The disruption caused by ITOM incidents can lead to downtime, reduced productivity, and loss of revenue. To manage these incidents, IT operations teams employ incident management tools (e.g. Newrelic™) and platforms (e.g., Freshservice®) to promptly identify, prioritize, and resolve incidents in order to restore normal operations as quickly as possible.

In an ITOM platform such as Freshservice®, incidents are typically classified into two types:
  Direct incidents: incidents that are created in response to notifications received directly from monitoring tools through web-hook listeners or email integrations. Direct incidents do not involve any intermediate modules.
  Rule-based incidents: incidents that are created based on configured rules within an intermediate module (e.g., Freshservice®—Alert management system) of the ITOM platform.

Rule-based incidents are triggered when certain conditions are met such as a particular event or performance threshold being exceeded. Furthermore, rule-based incidents have a specific pattern, since rule-based incidents are based on pre-defined templates and payloads for generation. A specific pattern may include incident type, severity level, affected service or application, region of the service/application, impacted metric value, etc. Below are a few examples of specific patterns:
  An increase in response time for a specific web application caused by an overload on the server.
  A sudden spike in CPU usage for a specific application due to a memory leak in the code.
  A series of failed logins for a specific user indicating a possible security breach.
  A drop in network traffic for a specific service, indicating a connectivity issue.

Payloads are specific data included in the incident record such as error messages, logs, or performance metrics. Payloads are automatically generated by monitoring tools, and ensure that the incident record contains the relevant data to accurately diagnose and resolve the incident.

Templates are pre-designed frameworks that define a structure of an incident record, including key information such incident type, severity, category, contact details, etc. Templates also ensure consistency and comprehensiveness in rule-based incidents across monitoring tools for efficient and optimal incident creation, management and resolution within the platform.

In some cases, the content cannot be read as a sentence due to the spacing and structure defined in the content. This content may not be considered for processing unlike other natural language processing (NLP) problems because of the missing sentence structure. The web-hook based incidents can contain semi-structured text with similar problems.

In ITOM domain, since incidents are source of information for many use cases, the incidents have tremendous value in processing the incidents to extract the key-values. This is important since the key-value data can be reused.

While approaches using standard NLP techniques for different applications in ITOM are used, none of these techniques extract key-value data. Thus, an improved technique to extract key-value data from an incident may be beneficial.

SUMMARY

Certain embodiments of the present invention may provide solutions to the problems and needs in the art that have not yet been fully identified, appreciated, or solved by current data extraction technologies. For example, some embodiments of the present invention pertain to a technique for extracting key-value data from an incident.

In an embodiment, a computer-implemented method for extracting key-value attributes from unstructured data includes receiving, by a parser, a first incident comprising key-value attributes and a second incident comprising key-value attributes, and parsing, by the parser, the first incident for the key-value attributes and the second incident for key-value attributes. The method also includes performing, by a machine learning (ML) model, a pairwise comparison of one or more common key-value attributes associated with the first incident and the second incident. The method further includes computing, by a cosine similarity module, a cosine similarity between the one or more common key-value attributes to generate a score for each of the one or more common key-value attributes associated with the first incident and the second incident, and generating, by the cosine similarity module, a final score between the first incident and the second incident by averaging all cosine similarity scores computed for each of the one or more common key-value attributes.

A system configured to extract key-value attributes from unstructured data includes memory comprising a set of instructions and at least one processor. The set of instructions are configured to cause the at least one processor to execute receiving, by a parser module, a first incident comprising key-value attributes and a second incident comprising key-value attributes, and parsing, by the parser module, the first incident for the key-value attributes and the second incident for key-value attributes. The set of instructions are further configured to cause the at least one processor to execute performing, by a ML model, a pairwise comparison of one or more common key-value attributes associated with the first incident and the second incident. The set of instructions are further configured to cause the at least one processor to execute computing, by a cosine similarity module, a cosine similarity between the one or more common key-value attributes to generate a score for each of the one or more common key-value attributes associated with the first incident and the second incident. The set of instructions are further configured to cause the at least one processor to execute generating, by the cosine similarity module, a final score between the first incident and the second incident by averaging all cosine similarity scores computed for each of the one or more common key-value attributes.

In yet another embodiment, a computer program is embodied on a non-transitory computer-readable medium and is configured to extract key-value attributes from unstructured data. The computer program being configured to cause at least one processor to execute receiving, by a parser module, a first incident comprising key-value attributes and a second incident comprising key-value attributes, and parsing, by the parser module, the first incident for the key-value attributes and the second incident for key-value attributes. The computer program is further configured to cause at least one processor to execute performing, by a ML model, a pairwise comparison of one or more common key-value attributes associated with the first incident and the second incident. The computer program is further configured to cause at least one processor to execute computing, by a cosine similarity module, a cosine similarity between the one or more common key-value attributes to generate a score for each of the one or more common key-value attributes associated with the first incident and the second incident. The computer program is further configured to cause at least one processor to execute generating, by the cosine similarity module, a final score between the first incident and the second incident by averaging all cosine similarity scores computed for each of the one or more common key-value attributes.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
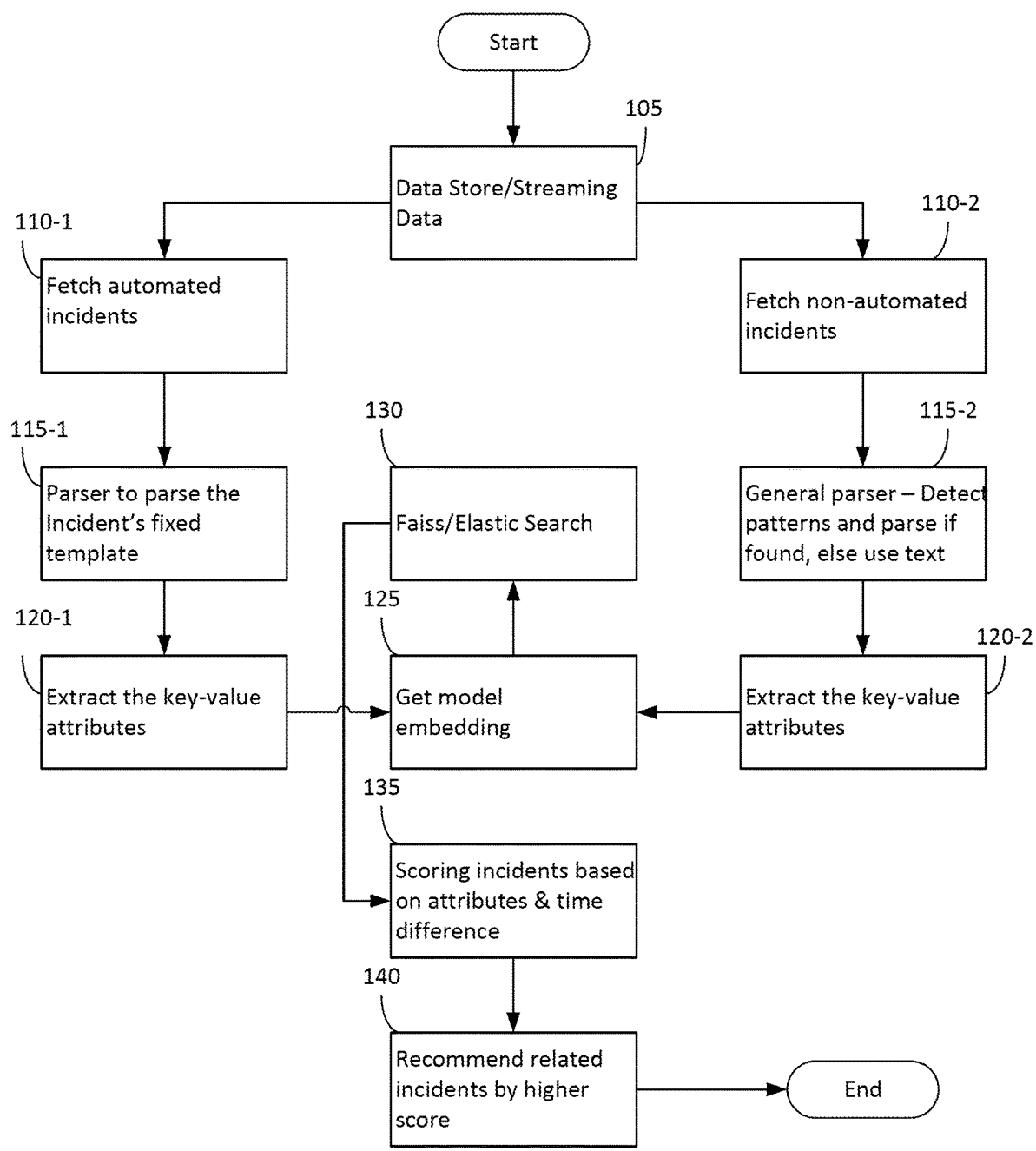
FIG. 1 is a flow diagram illustrating a method for an example use case of 'related incidents' using a defined extraction logic, according to an embodiment of the present invention.

Some embodiments pertain to a technique for extracting key-value data (or attributes) from an incident. Generalizing extraction of key-value data for further use in multiple applications is the first of its kind in the ITOM field. Since the incidents are rule based, the content has a semi-structured data unlike English sentences, which otherwise contain semantic structure. It should be noted that incidents (i.e., rule-based or direct) typically do not follow conventional English phrasing, grammar and semantics. Further, monitoring tools often send information as semi-structured or unstructured payloads, both of which do not generate sentences with a clear semantic structure. This lack of consistency in how incidents are described create challenges for incident management and resolution.

In some embodiments, comparison of text leads between two separate incidents may include comparing irrelevant information between the two text leads. In this embodiment, the text leads are compared at different dimensions. For example, because text in the ITOM domain comes in all form, filters may be used to remove incidents, which are created by a user.

Additionally, it should be noted that the text found in rule based incidents have proper structure. However, since these incidents are from various monitoring tools, the structure and content vary. To extract the attributes, a generalized logic is implemented to extract the attributes based on a few seen patterns. For explanation purposes only, few seen patterns refer to a limited number of repetitive & and recognizable patterns that have been observed in the incident, which are coming from various monitoring tools. These few seen patterns may include certain keywords or phrases, specific data formats or structures, or other identifiable characteristics that extract relevant information from the text.

In short, the goal of using a generalized logic based on these few seen patterns is to ensure consistency in the way that incident attributes are identified and extracted, even though the text of the incidents may vary in terms of structure and content.

If a new pattern or patterns are encountered, the existing list is updated with the newly encountered pattern and the logic gets additional capability to process sentences with this pattern. By following this technique, the pattern bank is progressively updated and the overall efficiency is improved.

Data Preparation

For rule based incidents created by rules, a fixed template in the incident description can be found. For human-created incidents, however, the text is free-form. So, extracting attributes would not be possible for all the incidents.

To resolve this issue, some of the general entities and PII information, such as uniform resource locator (URL), dates and email ID, are masked to help with the extraction of table attributes and for PII information masking. For explanation purposes only, Personal Identifiable Information (PII) refers to any data that can be used to identify a specific individual such as name, address, telephone number or email address. PII is often subject to privacy and data protection regulations, because PII is sensitive and vulnerable to misuse or unauthorized access.

Attribute Extraction Logic

For rule based incidents, the template is repeated for all customers. This allows for straightforward extracting of the attributes from the template.

The challenge however would be during the extraction of attributes from the web-hook based incidents, where there is no fixed template or format in the incident's content. To overcome the challenge, multiple patterns of text content are identified in the incident's description, and rules are defined to identify and extract the attributes using regular expression (RegEx) and HyperText Markup Language (HTML) elements. If a defined pattern is not identified, then a comparison of the full text and score calculation of the incidents is performed.

Model Selection

In some embodiments, attribute matching is performed to calculate the scores, and when patterns are not identified, full-text comparison is performed. With attribute matching, a dynamic set of attributes are expected since these attributes are extracted based on the incident content/description. Further, the common attributes between two given incidents are compared.

In embodiments where there are 3 attributes extracted between the given incidents, the following example may be used.

1st incident—
  Region: us-east
  Resource: RNNIS-slave-sr
  Severity: Critical
2nd incident—
  Region: ap-south
  Resource: RNNIS-slave-pr
  Service: Proxy In this example, 2 common attributes between these incidents are compared and embeddings for each common attribute value are generated. Finally, the cosine similarity between the common attributes pairwise is computed.

Continuing with this example, in the 1st incident, attribute 'Region' has value 'us-east' and in 2nd incident, attribute 'Region' has value 'ap-south'. Here, the embeddings are generated for the values (us-east and ap-south) and cosine similarity is computed.

Similarly, cosine similarity for each common attribute is computed and the computed value is aggregated by taking an average. To work for both cases, a mini language-model based on the sentence-BERT transformer is used. Mini language-model is defined as a small and fast Language model, which is designed to reduce the latency due to large computations by reducing the model size (parameters) by 50 percent. At the same time, however, the accuracy is retained by approximately 99%.

Score Calculation

An Exploratory Data Analysis (EDA) was performed, the complete text match for the rule based incidents was found to perform poorly. This is because of the presence of unwanted text content such as encoded text and authorization tokens. In order to decide which method would be best to consider, different ways of computing the scores were explored. As discussed, the score was computed directly by applying the model on the entire text, which was the first approach. This approach had a relatively lower performance compared to pairwise comparison of attributes. For this reason, the latter approach was selected.

To overcome this problem, entities were extracted from the incidents. For purposes of explanation, entities may be interchangeably used for attributes. Entities may then be compared, and the final score over all the entity matching scores are averaged. In some embodiments, entities are extracted from the incident details using the model based on the logic, which is detailed above.

In some embodiments, the time component matters to remove unwanted false positives, and is incorporated by computing the time decay with a tuned constant value. This is accomplished by adjusting the final score, where one additional variable is introduced to the equation. This variable is a product of time-decay constant with the time difference between the incidents. Selecting the time decay constant is an iterative process, where multiple simulations are run for different values of the constant and the constant giving the best results are selected. Since time decay is used, scores are high when the time difference between the incidents is low and vice-versa. All incidents within the short time window of the query incident are considered.

APPLICATIONS AND EXAMPLES

We can generalize this technique to alerts and other semi-structured data, such as forms, tables etc.

Key-value extraction from alerts/incidents can be useful in many ITOM applications such as Related incidents (e.g., incidents which are created because of the same probably root cause), Related Code/config deployments (e.g., probable deployment event responsible for the creation of the given incident), and Grouping (e.g., Group the alerts based on the co-occurrence or by certain extracted attributes), etc.

FIG. 1 is a flow diagram illustrating a method 100 for an example use case of 'related incidents' using a defined extraction logic, according to an embodiment of the present invention. In some embodiments, method 100 begins at 105 with a data store/streaming data step. For example, the incident data is stored in a database. This incident data may be fetched directly using queries, or in some embodiments, streaming data in real-time may be fetched when the steaming data is created.

At 110-1, method 100 includes performing a fetch automated incidents. In this step, all incidents that are from the common platform are considered automated incidents. The automated incidents may be identified by way of the source identification of the incident. At 110-2, method 100 includes performing fetch non-automated incidents. In this step, the incidents that are from sources other than a common platform are considered non-automated incidents.

At 115-1, method 100 includes performing parsing of the incident's fixed template. When the incidents are identified as automated and the pattern is known, the key-value attributes are extracted by the parser at 120-1.

At 115-2, method 100 includes performing a general parser. At 120-2, when the incidents are identified as non-automated and the pattern is dynamic, the key-value attributes from these incidents are extracted based on the commonly seen patterns. If none of the patterns match, attributes are not extracted. Instead the entire text is used for further processing.

At 125, method 100 includes performing a get model embedding function. In the case of the extracted key-value attributes, key-value attribute values are passed through the model to generate the embedding, which may be used for comparison later. Otherwise, the entire text is passed through the model to generate the embedding for further processing.

At 130, method 100 includes performing a Faiss/Elasticsearch function. For example, to efficiently reuse the embedding generated by the model, the embeddings and the incidents are indexed on Elasticsearch. For purposes of explanation, ElasticSearch™ is an open-source search and analytics engine designed to store, search, and analyze large volumes of data quickly and in near-real time. It uses a distributed, multi-node architecture to provide fast search capabilities, support complex search queries, and enable full-text search, geospatial search, and analytics. In the context of the sentence provided, the embeddings and incidents are indexed on Elasticsearch to make it easier and faster to search and retrieve information from them.

At 135, method 100 includes performing a score computation function. In this step, the Elasticsearch computes the cosine similarity between the incoming incident and the previous incidents' attributes (e.g., considered only incidents that are within the last 24 hours). This helps to aggregate all attribute scores to an average score and rank the incidents. Time decay is also applied on this score using the time difference between the incoming incident and the previous incidents.

At 140, method 100 includes performing a recommendation function. For example, using the calculated scores, the incidents are ranked and the incidents with scores in the top five are recommended as related incidents.

Figure 2:
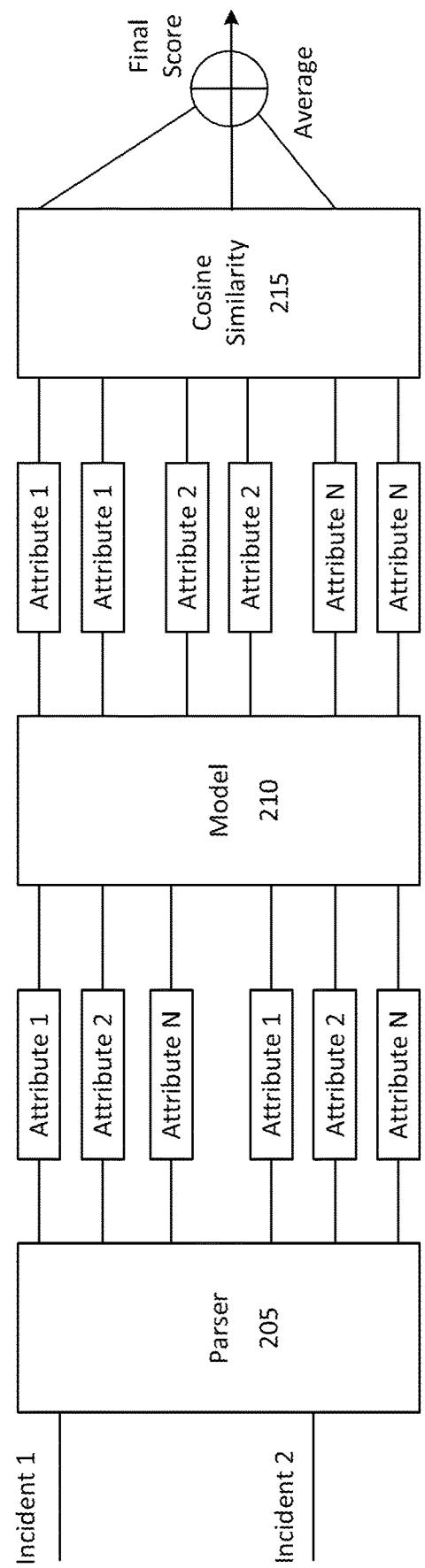
FIG. 2 is a diagram illustrating a system for extracting and comparing attributes, according to an embodiment of the present invention.

FIG. 2 is a diagram illustrating a system 200 for extracting and comparing attributes, according to an embodiment of the present invention. In the diagram, only common attributes between the model and cosine similarity are computed. In short, FIG. 2 shows a matching process along with a scoring mechanism between two incidents.

In this embodiment, FIG. 2 shows that incident 1 and incident 2 are passed through parser 205 with an expectation to extract the key-value attributes for each incident. Among the key-value attributes extracted from both incidents, common key-value attributes are important for comparison in the next step.

With model 210, if there are common key-value attributes, pairwise comparison is performed using the values of their key-value attributes. For example, as shown in FIG. 2, the key-value of Attribute 1 from Incident 1 is compared with the key-value of Attribute 1 from Incident 2. In this example, if the key-value of Attribute 1 is common between incident 1 and incident 2, the cosine similarity is performed at 215. It should be noted that all other key-value attributes are checked if there is common key-values and compared pairwise.

Cosine similarity 215 is computed between common key-value attributes to get a score for each key-value attribute. It should be noted that Cosine Similarity is a standard defined arithmetic computation between 2 vectors. Cosine similarity between 2 vectors is computed using the below formula.

$$\text{similarity}(A, B) = \cos(\theta) = \frac{(A \cdot B)}{(\|A\|\|B\|)} \qquad \text{Equation (1)}$$

where $\theta$ is the angle between vectors, $A \cdot B$ is a dot production between A and B and calculated as $$A \cdot B = A^T B = \sum_{i=1}^{n} A_i B_i = A_1 B_1 + A_2 B_2 + \ldots + A_n B_n \qquad \text{Equation (2)}$$

where $\|A\|$ represent the L2 norm or magnitude of the vector, which is calculated as $$\|A\| = \sqrt{A_1^1 + A_1^2 + \ldots A_1^n} \qquad \text{Equation (3)}$$

Final score of how similar the incident 1 and incident 2 is calculated by averaging all the cosine similarity scores computed for the common attributes.

$$\text{Final Score} = \frac{\text{SUM}(CS1, CS2, \ldots CSm)}{m} \qquad \text{Equation (4)}$$

where CS1, CS2, . . . CSm are the cosine similarity scores of 'm' common attributes.

Figure 3:
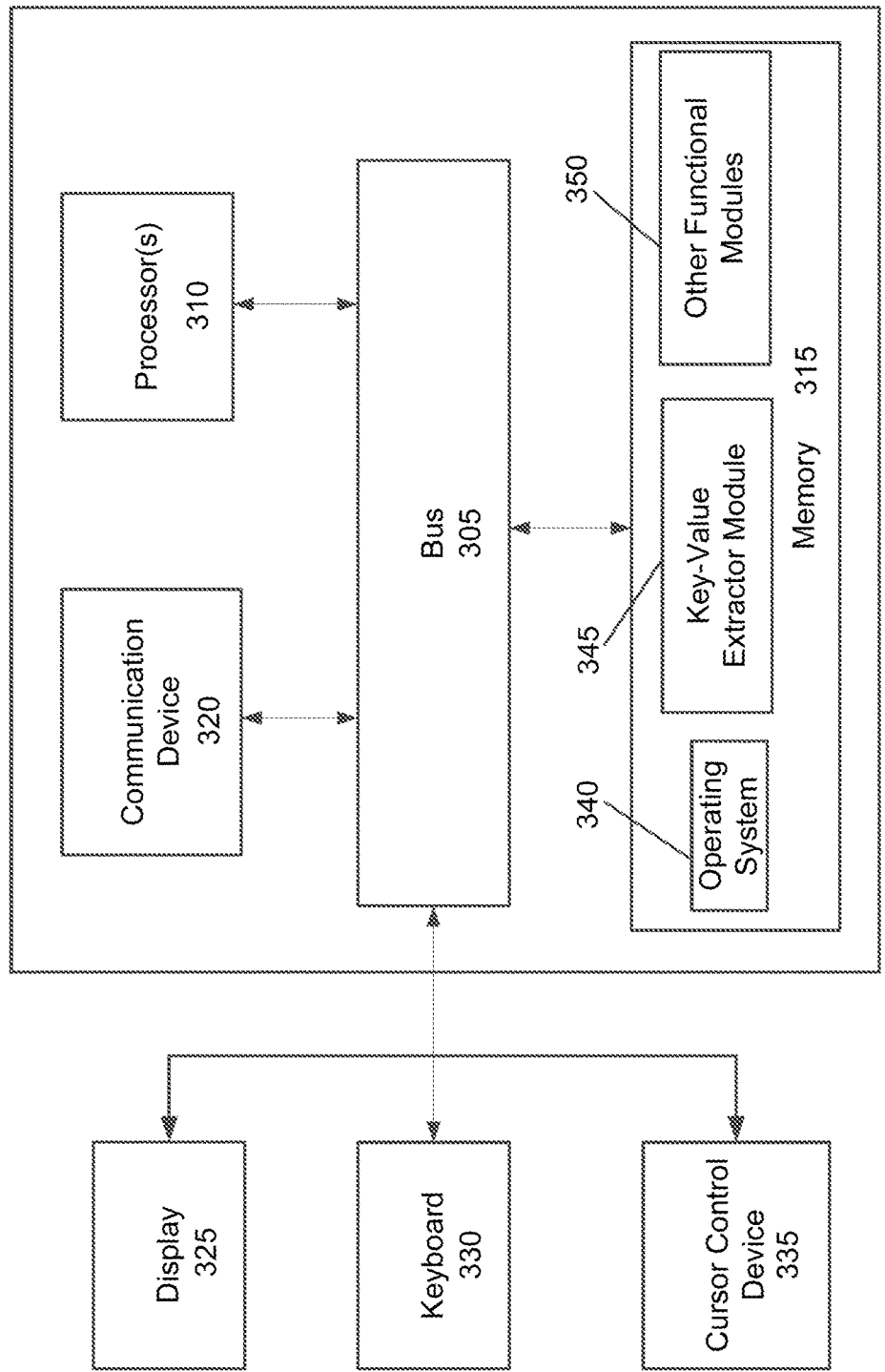
FIG. 3 is an architectural diagram illustrating a computing system configured to extract key-value data from unstructured data, according to an embodiment of the present invention.

FIG. 3 is an architectural diagram illustrating a computing system 300 configured to extract key-value data from unstructured data, according to an embodiment of the present invention. In some embodiments, computing system 300 may be one or more of the computing systems depicted and/or described herein. Computing system 300 includes a bus 305 or other communication mechanism for communicating information, and processor(s) 310 coupled to bus 305 for processing information. Processor(s) 310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 300 further includes a memory 315 for storing information and instructions to be executed by processor(s) 310. Memory 315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 300 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335, such as a computer mouse, a touchpad, etc., are further coupled to bus 305 to enable a user to interface with computing system. However, in certain embodiments, a physical keyboard and mouse may not be present, and the user may interact with the device solely through display 325 and/or a touchpad (not shown). Any type and combination of input devices may be used as a matter of design choice. In certain embodiments, no physical input device and/or display is present. For instance, the user may interact with computing system 300 remotely via another computing system in communication therewith, or computing system 300 may operate autonomously.

Memory 315 stores software modules that provide functionality when executed by processor(s) 310. The modules include an operating system 340 for computing system 300. The modules further include a key-value extractor module 345 that is configured to perform all or part of the processes described herein or derivatives thereof. Computing system 300 may include one or more additional functional modules 350 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 1 may be performed by a computer program, encoding instructions for the processor(s) to perform at least part of the process(es) described in FIG. 1, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 310 of computing system 300 of FIG. 3) to implement all or part of the process steps described in FIG. 1, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for extracting key-value attributes from unstructured data, comprising:
   receiving, by a parser, a first incident comprising key-value attributes and a second incident comprising key-value attributes, wherein the first incident and the second incident refer to an unforeseen event or issue affecting performance and functionality of an information technology (IT) system, service, or application;
   parsing, by the parser, the first incident for the key-value attributes and the second incident for key-value attributes;
   performing, by a machine learning (ML) model, a pairwise comparison of one or more common key-value attributes associated with the first incident and the second incident;
   computing, by a cosine similarity module, a cosine similarity between the one or more common key-value attributes to generate a score for each of the one or more common key-value attributes associated with the first incident and the second incident;
   generating, by the cosine similarity module, a final score between the first incident and the second incident by averaging all cosine similarity scores computed for each of the one or more common key-value attributes; and
   performing a recommendation function by ranking each incident and identifying each incident with a score in top five as related incidents for management and resolution of each incident, and resolving one of the incidents from the top five.

2. The computer-implemented method of claim 1, further comprising:
   extracting the key-value attributes associate with the first incident and the key-value attributes associated with the second incident.

3. The computer-implemented method of claim 1, further comprising:
   searching, by the ML model, for the one or more common key-value attributes between the key-value attributes of the first incident and the key-value attributes of the second incident.

4. The computer-implemented method of claim 1, wherein performing the cosine similarity between the one or more common key-value attributes comprises computing the cosine similarity between a first vector and a second vector, as follows $$\text{similarity}(A, B) = \cos(\theta) = \frac{(A \cdot B)}{(\|A\|\|B\|)}$$

where $\theta$ is the angle between the first vector and the second vector, and
$A \cdot B$ is a dot production between A and B.

5. The computer-implemented method of claim 4, further comprising:
   computing the dot production between A and B as follows $$A \cdot B = A^T B = \sum_{i=1}^{n} A_i B_i = A_1 B_1 + A_2 B_2 + \ldots + A_n B_n$$

where $\|A\|$ represent an L2 norm or magnitude of the first vector or the second vector.

6. The computer-implemented method of claim 5, further comprising:
   calculating the L2 norm or the magnitude of the first vector or the second vector as follows
   $\|A\| = \sqrt{A_1^1 + A_1^2 + \ldots A_1^n}$.

7. The computer-implemented method of claim 6, wherein the generating the final score between the first incident and the second incident further comprises
   averaging all the cosine similarity scores computed for each of the one or more common key-value attributes as follows $$\text{Final Score} = \frac{\text{sum}(CS1, CS2, \ldots CSm)}{m}$$

where CS1, CS2, ... CSm are the cosine similarity scores of 'm' common attributes.

8. A system configured to extract key-value attributes from unstructured data, comprising:
   memory comprising a set of instructions; and
   at least one processor, wherein
   the set of instructions are configured to cause the at least one processor to execute:
      receiving, by a parser module, a first incident comprising key-value attributes and a second incident comprising key-value attributes, wherein the first incident and the second incident refer to an unforeseen event or issue affecting performance and functionality of an information technology (IT) system, service, or application;
      parsing, by the parser module, the first incident for the key-value attributes and the second incident for key-value attributes;
      performing, by a machine learning (ML) model, a pairwise comparison of one or more common key-value attributes associated with the first incident and the second incident;
      computing, by a cosine similarity module, a cosine similarity between the one or more common key-value attributes to generate a score for each of the one or more common key-value attributes associated with the first incident and the second incident;

generating, by the cosine similarity module, a final score between the first incident and the second incident by averaging all cosine similarity scores computed for each of the one or more common key-value attributes; and performing a recommendation function by ranking each incident and identifying each incident with a score in top five as related incidents for management and resolution of each incident, and resolving one of the incidents from the top five.

9. The system of claim 8, wherein the set of instructions are further configured to cause the at least one processor to execute:

extracting the key-value attributes associate with the first incident and the key-value attributes associated with the second incident.

10. The system of claim 8, wherein the set of instructions are further configured to cause the at least one processor to execute:

searching, by the ML model, for the one or more common key-value attributes between the key-value attributes of the first incident and the key-value attributes of the second incident.

11. The system of claim 8, wherein the set of instructions are further configured to cause the at least one processor to execute:

computing the cosine similarity between a first vector and a second vector, as follows $$\text{similarity}\,(A, B) = \cos(\theta) = \frac{(A \cdot B)}{(\|A\|\|B\|)}$$

where $\theta$ is the angle between the first vector and the second vector, and

A·B is a dot production between A and B.

12. The system of claim 11, wherein the set of instructions are further configured to cause the at least one processor to execute:

computing the dot production between A and B as follows $$A \cdot B = A^T B = \sum_{i=1}^{n} A_i B_i = A_1 B_1 + A_2 B_2 + \ldots + A_n B_n$$

where $\|A\|$ represent an L2 norm or magnitude of the first vector or the second vector.

13. The system of claim 12, wherein the set of instructions are further configured to cause the at least one processor to execute:

calculating the L2 norm or the magnitude of the first vector or the second vector as follows $\|A\| = \sqrt{A_1^1 + A_1^2 + \ldots A_1^n}$.

14. The system of claim 13, wherein the set of instructions are further configured to cause the at least one processor to execute:

averaging all the cosine similarity scores computed for each of the one or more common key-value attributes as follows $$\text{Final Score} = \frac{\text{sum}(CS1, CS2, \ldots CSm)}{m}$$

where CS1, CS2, . . . CSm are the cosine similarity scores of 'm' common attributes.

15. A non-transitory computer-readable medium comprising a computer program configured to extract key-value attributes from unstructured data, the computer program being configured to cause at least one processor to execute:

receiving, by a parser module, a first incident comprising key-value attributes and a second incident comprising key-value attributes, wherein the first incident and the second incident refer to an unforeseen event or issue affecting performance and functionality of an information technology (IT) system, service, or application;

parsing, by the parser module, the first incident for the key-value attributes and the second incident for key-value attributes;

performing, by a machine learning (ML) model, a pairwise comparison of one or more common key-value attributes associated with the first incident and the second incident;

computing, by a cosine similarity module, a cosine similarity between the one or more common key-value attributes to generate a score for each of the one or more common key-value attributes associated with the first incident and the second incident;

generating, by the cosine similarity module, a final score between the first incident and the second incident by averaging all cosine similarity scores computed for each of the one or more common key-value attributes; and performing a recommendation function by ranking each incident and identifying each incident with a score in top five as related incidents for management and resolution of each incident, and resolving one of the incidents from the top five.

16. The non-transitory computer-readable medium of claim 15, wherein the computer program is further configured to cause at least one processor to execute:

searching, by the ML model, for the one or more common key-value attributes between the key-value attributes of the first incident and the key-value attributes of the second incident.

17. The non-transitory computer-readable medium of claim 15, wherein the computer program is further configured to cause at least one processor to execute:

computing the cosine similarity between a first vector and a second vector, as follows $$\text{similarity}\,(A, B) = \cos(\theta) = \frac{(A \cdot B)}{(\|A\|\|B\|)}$$

where $\theta$ is the angle between the first vector and the second vector, and

A·B is a dot production between A and B.

18. The non-transitory computer-readable medium of claim 17, wherein the computer program is further configured to cause at least one processor to execute:

computing the dot production between A and B as follows $$A \cdot B = A^T B = \sum_{i=1}^{n} A_i B_i = A_1 B_1 + A_2 B_2 + \ldots + A_n B_n$$

where $\|A\|$ represent an L2 norm or magnitude of the first vector or the second vector.

19. The non-transitory computer-readable medium of claim 18, wherein the computer program is further configured to cause at least one processor to execute:

calculating the L2 norm or the magnitude of the first vector or the second vector as follows $\|A\| = \sqrt{A_1^1 + A_1^2 + \ldots A_1^n}$.

20. The non-transitory computer-readable medium of claim 19, wherein the computer program is further configured to cause at least one processor to execute:

averaging all the cosine similarity scores computed for each of the one or more common key-value attributes as follows $$\text{Final Score} = \frac{\text{sum}(CS1, CS2, \ldots CSm)}{m}$$

where CS1, CS2, ... CSm are the cosine similarity scores of 'm' common attributes.

* * * * *